Patented Apr. 15, 1924.

1,490,719

UNITED STATES PATENT OFFICE.

EDMUND L. ZUKOSKI, OF ST. LOUIS, MISSOURI.

PROCESS FOR TREATING SAWDUST.

No Drawing.   Application filed March 8, 1922. Serial No. 542,196.

*To all whom it may concern:*

Be it known that I, EDMUND L. ZUKOSKI, a citizen of the United States, residing in the city of St. Louis, in the State of Missouri, have invented a new and useful Improvement in Processes for Treating Sawdust, of which the following is a full, clear, and exact specification.

My invention relates to processes for treating sawdust; but, while it is more specifically directed to a process for the treatment of sawdust, it may also be used for treating any other fibrous or woody material.

Heretofore sawdust could be used only to a limited extent as an aggregate in the manufacture of concrete, insulating material, plastic compound, molding compositions, or the like, since when the sawdust was combined with a cementitious binding material and water, the water would soak into the pores of the sawdust thereby dissolving certain chemical bodies in the sawdust which act on the cement to prevent proper setting.

The objects of my invention are to provide a process for treating sawdust which will enhance the commercial use of sawdust so treated in the manufacture of concrete, insulating material, et cetera; to provide a process for treating sawdust which will remove properties from the sawdust which prevent proper setting when it is used as an aggregate with cement and water; and to provide a process for treating sawdust which will render a liquor that may be used as an ingredient in chemical combinations.

My process for treating sawdust consists in subjecting it to the action of a solution of an alkaline silicate, preferably sodium silicate, (water glass). When subjecting the sawdust to this action it is, preferably, placed in a suitable mixing tub, the solution is applied thereto until the sawdust is covered thereby, and the mass is agitated until the solution has thoroughly saturated the sawdust. Care should be taken so that the solution is not drawn off until it has thoroughly acted to remove all chemical bodies which prevent the binding of a cement when the sawdust is used as an aggregate in concrete. Bubbles will rise to the top of the solution until the chemical action has been completed, and, in some instances, this action will continue for twenty-four hours. During this subjection the solution of sodium silicate removes all the chemical bodies from the sawdust which if dissolved in water when used with cement would prevent proper setting. After this action is completed the liquor derived from the subjection is separated from the sawdust and the residue is, preferably, washed. The washing is continued until the water used in washing runs virtually clear. After the residue has been thoroughly cleaned by the washing it may be dried, but, of course, if the sawdust which has been treated is to be used in combination with water it is not dried. The liquor which is derived when the sodium silicate is subjected to the sawdust and the liquid separated therefrom may be used in numerous different ways as a by-product independent of the use of the residue of the sawdust.

In practice is has been found that in treating the sawdust a solution of one part sodium silicate to sixty-four parts water will give the most satisfactory results. However, I do not propose to limit myself to any particular strength of solution since it is obvious that the solution may be varied within wide limits without deviating from the spirit of my invention.

What I claim as new and desire to secure by Letters, is:

1. A process for treating sawdust comprising subjecting the sawdust to the action of a solution of an alkaline silicate, and then freeing the solid matter of said sawdust from said solution and its contained substances.

2. A process for treating sawdust consisting in subjecting said sawdust to the action of a solution of sodium silicate whereby said sodium silicate will act to remove certain chemical bodies from said sawdust, removing the liquor resulting from said subjection from said sawdust, and washing the residue.

In witness whereof I have signed my name to this specification.

EDMUND L. ZUKOSKI.